(12) United States Patent
Bredehoft (10) Patent No.: US 7,818,357 B2
(45) Date of Patent: Oct. 19, 2010

(54) SYSTEMS AND METHODS FOR IMPLEMENTING CORDIC ROTATIONS FOR PROJECTORS AND RELATED OPERATORS

(75) Inventor: Leo Bredehoft, Longmont, CO (US)

(73) Assignee: Rambus Inc., Los Altos, CA (US)

( * ) Notice: Subject to any disclaimer, the term of this patent is extended or adjusted under 35 U.S.C. 154(b) by 1274 days.

(21) Appl. No.: 11/287,175

(22) Filed: Nov. 23, 2005

(65) Prior Publication Data

US 2007/0130241 A1 Jun. 7, 2007

(51) Int. Cl.
G06F 7/38 (2006.01)
(52) U.S. Cl. ...................................... 708/233
(58) Field of Classification Search ................. 708/233; 342/378; 375/264; 395/800
See application file for complete search history.

(56) References Cited

U.S. PATENT DOCUMENTS

| | | | | |
|---|---|---|---|---|
| 3,479,579 | A * | 11/1969 | Baker, Jr. ..................... | 324/303 |
| 5,317,753 | A * | 5/1994 | Kuenemund et al. ........... | 712/7 |
| 5,384,573 | A * | 1/1995 | Turpin ........................ | 342/179 |
| 6,212,668 | B1 * | 4/2001 | Tse et al. ...................... | 716/7 |
| 6,647,067 | B1 | 11/2003 | Hjelm et al. | |
| 6,954,530 | B2 | 10/2005 | Gunther | |
| 2005/0015418 | A1 * | 1/2005 | Chang et al. ................ | 708/232 |
| 2005/0041725 | A1 | 2/2005 | De Rivaz | |
| 2006/0029171 | A1 | 2/2006 | Jensen | |
| 2006/0056550 | A1 | 3/2006 | Skraparlis | |
| 2006/0093070 | A1 * | 5/2006 | Ibrahim et al. .............. | 375/324 |
| 2006/0115079 | A1 | 6/2006 | Heiman | |
| 2006/0285531 | A1 | 12/2006 | Howard | |
| 2006/0291550 | A1 | 12/2006 | Wang | |

OTHER PUBLICATIONS

XILINX DS249 Product Specification, Apr. 28, 2005, www.xilinx.com, p. 11.*
H. Dawid et al, "Digital Signal Processing for Multimedia Systems, Chapter 24: CORDIC Algorithms and Architectures," (1999).
R.T. Behrens, L.L. Scharf, "Signal Processing Applications of Oblique Projection Operators," IEEE Trans. On Signal Processing 42(6), 1413-1424.
S. Hsioa and J. Delosme, "Parallel Singular Value Decomposition of Complex Matrices Using Multidimensional CORDIC Algorithms," IEEE Trans. On Signal Processing, 44(3), 685-697.

* cited by examiner

*Primary Examiner*—Chat C Do
*Assistant Examiner*—Kevin Hughes
(74) *Attorney, Agent, or Firm*—Barcelo, Harrison & Walker, LLP (57) ABSTRACT

A CORDIC processor is configured to perform orthogonal or oblique CORDIC projections in order to cancel interference in a received signal. The CORDIC projection can be used to rotate an interference signal vector so that its only non-zero component is in the last Euclidean coordinate of the representative vector. A measurement vector is then subject to the same rotations as the interference vector. As a result of the rotation on the measurement vector, all components of the measurement vector parallel to the interference vector will be resolved onto the same coordinate as the rotated interference vector. The parallel components of the symbol vector can be cancelled by zeroing that coordinate, and the modified measurement vector can then be rotated back to its original coordinates, to produce an orthogonally projected version of the original measurement vector. Typically, the projection is onto a subspace that is orthogonal or oblique to an interference subspace, which may be one-dimensional.

28 Claims, 7 Drawing Sheets

SYSTEMS AND METHODS FOR IMPLEMENTING CORDIC ROTATIONS FOR PROJECTORS AND RELATED OPERATORS

BACKGROUND

1. Field of the Invention

The invention generally relates to wireless communication, and more particularly to interference cancellation in wireless communication systems.

2. Background of the Invention

Combating interference is a primary objective in virtually all wireless communication systems. For example in a cellular wireless communication system, there are typically two types of interference that are of primary concern: inter-channel interference and intra-channel interference.

Inter-channel interference occurs when multiple base stations communicating over the same frequency band interfere with each other. Intra-cell interference occurs when communication devices within a cell all communicate with the base station over the same carrier-frequency band and a common pseudo-noise carrier. In order to avoid interference between the devices, the communications from each device are coded with a covering code that allows the base station and devices operating within the cell to detect the appropriate communication signals and ignore the potentially interfering signals from other devices within the cell.

The covering codes used in the CDMA system are typically orthogonal codes. Thus, each communication device within a particular cell encodes its communications with a code that is orthogonal to the codes used by other communication devices within the cell. The orthogonal nature of the coded communications allows particular communication signals to be extracted from other communication signals using the same frequency. However, channel effects within the cell can degrade the orthogonal relationship between the coded signals, causing intra-cell interference between signals destined for different communication devices.

In addition, signals from adjacent cells can also cause interference. For example, in a CDMA system, signals in adjacent cells may use the same frequency for communication. Thus, inter-cell interference may result from communication signals in an adjacent cell, such as transmissions originating near the edge of the adjacent cell.

In conventional communication receivers, interference in a received signal is identified, and then any of various signal processing techniques is used to cancel the interference. For example, a projection operator may be used for projecting the interference out of the signal. Thus, conventional system designs attempt to apply the operator to the received signal to project out the interference and pass the desired signal. More compact and more efficient projection algorithms are required in order to reduce computational resources, memory size, processor size, etc.

SUMMARY

A CORDIC rotator may be configured to perform orthogonal projections in order to cancel interference in a received signal. CORDIC can be used to rotate an interference signal vector into a coordinate system where its only non-zero component is in its last Euclidean coordinate. A measurement vector is then subjected to the same rotations as the interference vector. As a result of the rotation of the measurement vector, all components of the measurement vector parallel to the interference vector will be in the same coordinate as the rotated interference vector. The parallel components of the symbol vector can be cancelled by zeroing that coordinate, and the modified measurement vector can then be rotated back to its original coordinates.

In one aspect, a rescaling factor is computed in order to compensate for projection foreshortening.

In another aspect, CORDIC used to implement orthogonal projections can comprise a single pipeline pair machine for implementing the projections. The pipeline output data can be re-circulated in order to minimize demands on memory.

In another aspect, memory can be eliminated altogether.

In still another aspect, time slicing of the pipeline among multiple projections, or another rotation task, can be performed.

In still another embodiment, the master and slave CORDIC rotation functions can be interleaved in the same pipeline in order to reduce the gate count. In such embodiments, the clock-cycle rate must be doubled to accommodate the interleaving while keeping the processing rate equal to that of a non-interleaved embodiment.

In still another embodiment, hierarchical coordinate pairing can be used to limit computational noise due to chained computations used in the CORDIC rotation.

In still another embodiment, a greedy coordinate-pairing scheme can be used in order to limit the number of buffer registers required in the CORDIC rotator. There is an increase in the maximum chained computation length. However, this trade-off is often tolerable for many implementations.

A CORDIC Rotator may comprise a means for rotating an interference signal to produce angle decisions; a means for rotating a measurement signal using the angle decisions to produce a rotated measurement signal; a means for generating a scaling factor; a means for scaling the rotated measurement signal using the generated scaling factor; and a means for de-rotating the measurement signal using the negative of the angle decisions.

The means for rotating an interference signal may include, by way of example, a master rotation pipeline configured to produce angle decisions.

The means for rotating a measurement signal may include, by way of example, a slave rotation pipeline configured for rotating the measurement signal using the angle decisions.

The means for generating a scaling factor may include, by way of example, a scaling factor generation block comprises a CORDIC x-to-y conversion block configured to perform an x-to-y coordinate conversion on the output of the slave rotation pipeline at the end of a forward pass, and a CORDIC divide block coupled with the CORDIC operation block, the CORDIC divide block configured to perform a CORDIC divide on the output of the CORDIC x-to-y conversion block.

The means for scaling may include, by way of example, a multiplier configured to multiply the output of the slave rotation pipeline by a scaling factor.

The means for de-rotating the measurement signal may include, by way of example, the slave pipeline, wherein the slave pipeline being further configured to de-rotate the measurement signal using negatives of the angle decisions.

These and other features, aspects, and embodiments of the invention are described below in the section entitled "Detailed Description."

BRIEF DESCRIPTION OF THE DRAWINGS

Features, aspects, and embodiments of the inventions are described in conjunction with the attached drawings, in which.

DETAILED DESCRIPTION OF THE PREFERRED EMBODIMENTS

Figure 1:
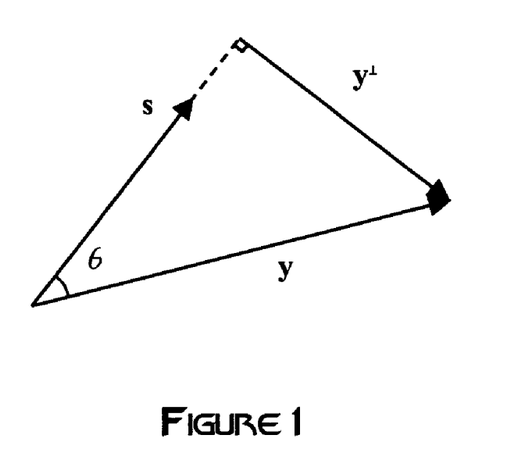
FIG. 1 is a vector diagram illustrating an example interference vector and measurement vector.

FIG. 1 is a vector diagram illustrating an interference vector s and a measurement vector y. When a received signal is sampled in a communication receiver at a given symbol rate, a measurement vector y is generated. Vector y comprises an interference component and an intended signal component. Vector y also comprises a noise component (not shown).

The orthogonal projection operation described herein computes the component $y^\perp$ of vector y, treating the samples in each as coordinate values, as shown in FIG. 1. The projection yields the component $y^\perp$, which is necessarily shorter than y and, thus, contains less energy. To ensure optimal radio performance, $y^\perp$ should then be scaled in order to account for the shortening of $y^\perp$ relative to y. Thus, a scaling factor $\beta$ can be computed in order to scale $y^\perp$. Generally, $y^\perp$ is shortened by a factor $\sin\theta$. Accordingly, scaling factor $\beta$ rescales $y^\perp$ by $\sin\theta$. More general values of $\beta$ may be employed, in which case $y^\perp$ is a version of y that has been subjected to subtractive cancellation.

The scaled vector $z=\beta y^\perp$ resulting from the projection should have an energy level matching that of the output of an automatic gain control (AGC) stage in the receiver. Accordingly, to restore the output symbol energy after projection, an AGC section can be included between the orthogonal projector described below and the radio input in the receiver.

Scaling in a practical implementation requires that $\beta$ be non-negative so that $\|z\|^2 = \|y\|^2$:

$$\|z\|^2 = \beta^2 y^H P_s^\perp y = \|y\|^2, \tag{1a}$$

where $$\frac{1}{\beta^2} = \sin^2\theta = \frac{y^H P_s^\perp y}{y^H y}. \tag{1b}$$

Figure 2:
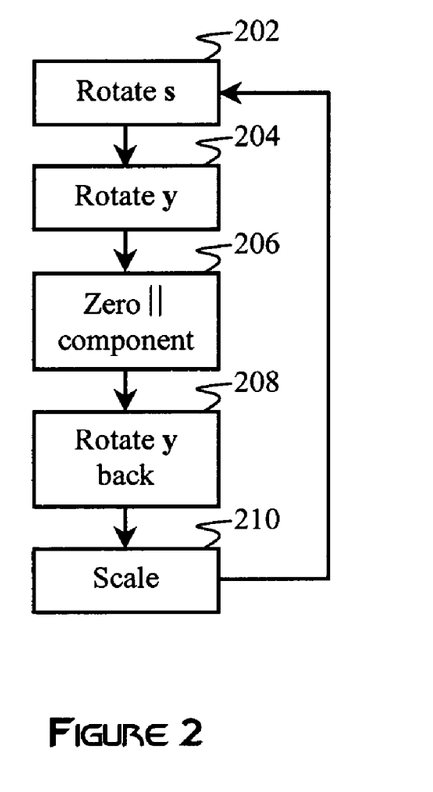
FIG. 2 is a flowchart illustrating an example method for performing an orthogonal CORDIC rotation in accordance with one embodiment.

FIG. 2 is a flow chart illustrating an exemplary method for performing an orthogonal projection in order to produce $y^\perp$ in accordance with one embodiment of the systems and methods described herein. In a first step 202, interference vector s is subjected to a series of rotations until its only non-zero component resides in its last Euclidian coordinate. The angles associated with each rotation can be stored and used to subject measurement vector y to the same rotations in step 204.

The part of y that is parallel to s will then be resolved onto this last coordinate of s. The components of y that are parallel to s can then be cancelled, or zeroed, in step 206 by simply zeroing its last coordinate. The resulting vector can then be rotated back in step 208 and scaled in step 210.

A CORDIC rotator can be used to perform the method of FIG. 2. A CORDIC rotator performs two-dimensional rotations using simple hardware components, such as adders and shifters. The rotations can be performed as a sequence of simple two-dimensional plane rotations, referred to as "Givens rotations." Various, matrix computations and digital signal processing algorithms have been expressed in terms of plane rotations implemented using CORDIC arithmetic.

Conventional projection techniques use the following equations:

$$y^\perp = P_s^\perp y = (I - s(s^T s)^{-1} s^T) y = y - s(s^T s)^{-1} s^T y \tag{2a}$$

$$\beta = \frac{\|y\|^2}{\|P_s^\perp y\|^2} \tag{2b}$$

The operation defined by equation (2a) is performed separately for I and Q channels. In the more general case, y and s may be complex, in which case the transpose$^T$ becomes a Hermitian transpose$^H$.

A conventional projector configured to perform the required projections represented by equation (2a) can comprise numerous gates. But increased performance often comes with a trade off of increased gate count or size. As explained below, the systems and methods described herein reduce the size of a CORDIC, without significantly impacting performance, through the use of a single pipeline pair machine for implementing the projections.

The orthogonal projection $P_s^\perp$ can be expressed simply as the application of a rotation $D_s$ to y (step 204), which rotates s (step 202) onto the last Euclidean coordinate $e_{N-1}$, followed by zeroing the last coordinate in the rotated result (step 206), and an inversion of the rotation $D_s^{-1}$ (step 208). This can be described using the following equations:

$$z = \beta y^\perp \tag{3}$$
$$y^\perp = P_s^\perp y = D_s^{-1}(I - Z)D_s y,$$

where $$Z = \begin{bmatrix} 0 & 0 & 0 & \cdots & 0 & 0 & 0 \\ 0 & 0 & 0 & & 0 & 0 & 0 \\ 0 & 0 & 0 & & 0 & 0 & 0 \\ \cdot & & & \cdot & & & \cdot \\ \cdot & & & & \cdot & & \cdot \\ \cdot & & & & & \cdot & \cdot \\ 0 & 0 & 0 & & 0 & 0 & 0 \\ 0 & 0 & 0 & & 0 & 0 & 0 \\ 0 & 0 & 0 & \cdots & 0 & 0 & 1 \end{bmatrix}, \tag{4}$$

Equation (5) illustrates the relationship between the previously described orthogonal projection and the components of y that are orthogonal and parallel to s:

$$y = D_s^{-1} I D_s y \tag{5}$$
$$= D_s^{-1}(Z + (I - Z))D_s y$$

-continued $$= D_s^{-1}(P_{e_{N-1}} + P_{e_{N-1}}^\perp)D_s y$$

$$= (P_s + P_s^\perp)y.$$

In the N-dimensional case, both the clockwise rotation $D_s$ and the counter-clockwise derotation $D_s^{-1}$ can be equivalent to a set of N−1 sequentially-applied length-preserving Givens rotations $Q_n$, each of which represents a rotation in a two-dimensional pair $(s_{n+1}, s_n)$ in coordinate plane $(e_{n+1}, e_n)$ into $(0, \sqrt{s_{n+1}^2+s_n^2})$ as described in the following equations:

$$D_s = \prod_{n=0}^{N-2} Q_n, \quad (6)$$

and $$D_s^{-1} = \prod_{n=N-2}^{0} Q_n^{-1} = \prod_{n=N-2}^{0} Q_n^T, \quad (7)$$

where $$Q_n^{-1}Q_n = Q_n^T Q_n = I. \quad (8)$$

Multiplication of s by $Q_n$ can be performed using the normalized CORDIC algorithm in vectoring mode on the coordinate pair, driving the CORDIC y-dimension to zero. In a master/slave arrangement, CORDIC rotations are performed on the dimension pairs of y corresponding to those in s. The rotation decisions made on $(s_{n+1}, s_n)$ to rotate s onto the CORDIC x-dimension are also made on $(y_{n+1}, y_n)$ to yield $y' = D_s y$.

Multiplication by (I−Z), in equation 3, amounts to setting $y'_{N-1}$ to zero. If the rotation decisions made for each $Q_n$ during multiplication by $D_s$ are stored, then these decisions may be applied in reverse to multiply by $D_s^{-1}$.

Note:

$$\beta = \frac{\|y\|}{\|P_s^\perp y\|} = \frac{\|y\|}{\sqrt{\|y\|^2 - \|P_s y\|^2}} = \frac{\|y\|}{\sqrt{\|y\|^2 - |y'_{N-1}|^2}}, \quad (9)$$

where $$|y'_{N-1}| = \|P_s y\|, \quad (10)$$

and y' is the output of the first pass over y. The CORDIC may be scaled thus:

$$\beta y^\perp = \frac{P_s^\perp y}{\sin\theta} = \frac{D_s^{-1}(I-Z)D_s y \|y\|}{\sqrt{\|y\|^2 - |y'_{N-1}|^2}}. \quad (12)$$

The value of $\|y\|$ is generally constant, due to the AGC in the radio front end, at about 0.63 times full scale, taken to be the maximum possible value $y_i$ for all i. The actual $\sin\theta$ correction involves multiplying $P_s^\perp y$ values by $\beta$ as they leave the associated CORDIC unit.

In certain embodiments, the expression under the radical can be computed in a single pass through the CORDIC algorithm, where the CORDIC rotator is operating in hyperbolic mode. Use of the hyperbolic mode is described in "Digital Signal Processing for Multimedia Systems, CH 22: CORDIC Algorithms and Architectures," H. Dawid and H. Meyr, Marcel Dekker, Inc. (1999), which is incorporated herein by reference in its entirety.

Figure 3:
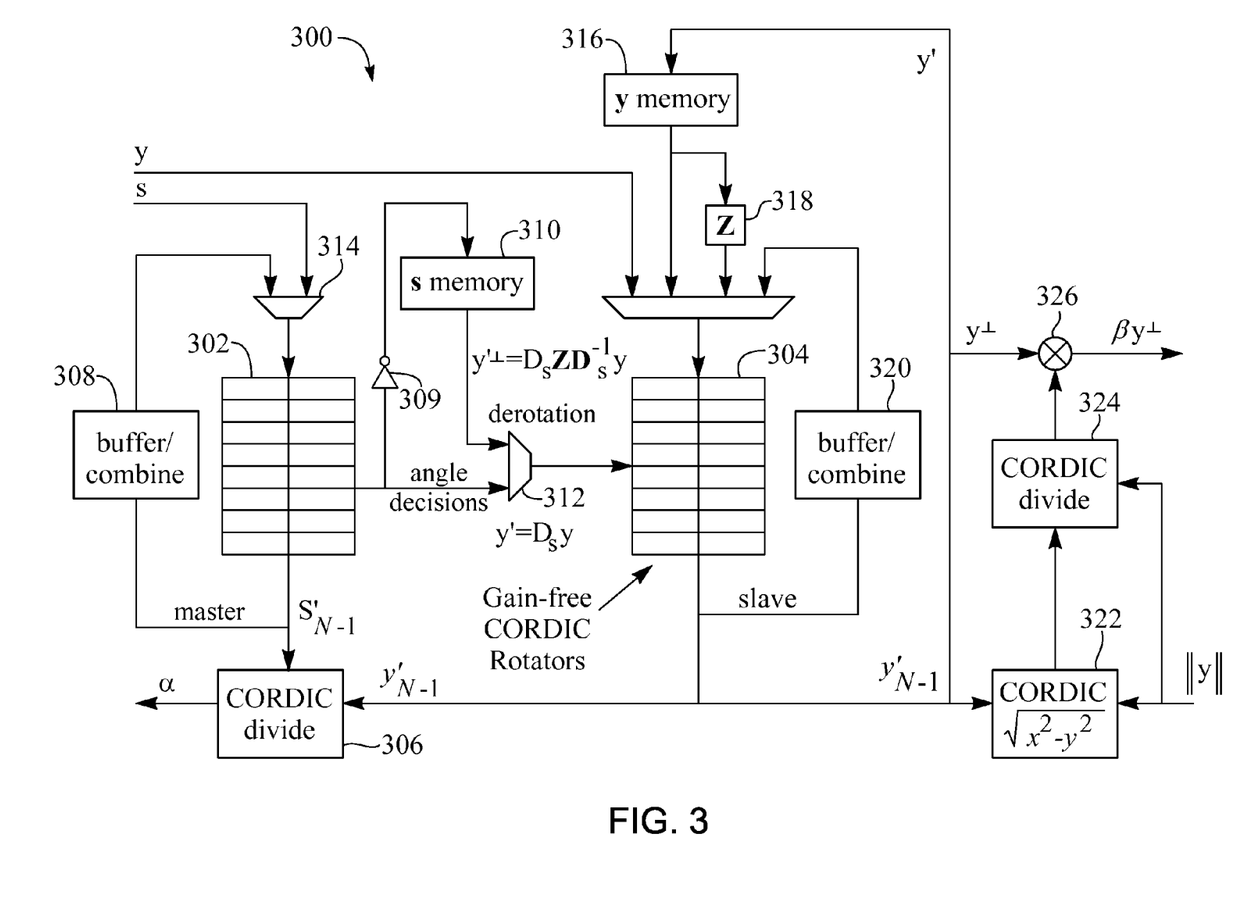
FIG. 3 is a diagram illustrating an example CORDIC rotator configured to implement the process of FIG. 2 on the vectors of FIG. 1 in accordance with one embodiment.

FIG. 3 is a diagram illustrating an example CORDIC rotator 300 configured in accordance with one embodiment of the systems and methods described herein. At the core of rotator 300 are the parallel pipelines, or CORDIC rotators, 302 and 304. Rotators 302 and 304 are configured to rotate s and y according to the methods and equations described above. Thus, as samples of interference signal s arrive at multiplexer 314, they are fed into pipeline 302, which rotates each sample pair passing through it by an angle that zeroes the CORDIC y-coordinate of the pair.

As described above, pipeline 302 can be configured to achieve the Givens rotations defined by multiplying s by $Q_n$. As is understood, a Givens rotation rotates a coordinate pair so that all of the energy resides in one coordinate, in this case the last Euclidian coordinate, after all coordinates have been paired and rotated. Buffer 308 can be configured to store the output of pipeline 302 for use in subsequent pairing for the forward pass through rotator 300. Dimension-pairing patterns for different lengths N are described in more detail below.

Angle decisions for the rotation of s are provided to pipeline 304 so that they can be used to rotate y as well. This will place all energy in y parallel to s in the same coordinate as s, so that it can be zeroed out. The angle decisions are also stored in memory 310, for use in derotating y after zeroing. The output of pipeline 304 is stored in buffer 320 for use in subsequent pairings.

The last output of pipeline 304 is $y'_{N-1}$. This can be fed, along with $\|y\|$ to CORDIC operation block 322, the output of which is fed to CORDIC divide block 324, in order to calculate $\beta$, according to equation (9). Multiplier 326 can then be used to calculate $\beta y^\perp$, according to equation (12).

The outputs of pipeline 304 are fed to memory 316 so that they can be used for the de-rotation of y using the angle decisions stored in memory 310.

CORDIC rotators 302 and 304 are said to be operating in a master/slave mode, where rotator 302 is the master and rotator 304 is the slave, since rotator 304 is controlled by the angle decisions produced from rotator 302. A master/slave arrangement is described in "Parallel Singular Value Decomposition of Complex Matrices Using Multidimensional CORDIC Algorithms," S. Hsioa and J. Delosme, IEEE Trans. On Signal Processing, 44(3), 685-697, (1996), which is incorporated herein in its entirety. There, the master is said to be operating in "evaluation" mode and the slave is said to be operating in "application" mode. The pair is also said to be performing implicit operations, since there is no explicit angle provided to the s rotator. Rather, only CORDIC-x and CORDIC-y dimensions are provided.

During the forward pass of the algorithm described herein, rotators 302 and 304 operate in parallel on s and y data, with the angle decisions in master s rotator 302 controlling rotation of y in slave rotator 304. In the embodiment of FIG. 3, negatives of the angle decisions are stored in s memory 310 for use in de-rotation of y. At the end of the forward pass, the $\sin\theta$ correction factor for use by the output multiplier is formed via a CORDIC x-to-y coordinate conversion, in CORDIC operation block 322, followed by a CORDIC divide in CORDIC divide block 324. These operations are represented as separate functional blocks in FIG. 3, even though they are performed using one of the CORDIC pipelines and do not significantly affect gate count.

During the reverse pass, the last coordinate of the rotated y, $Y'_{N-1}$, is zeroed, and rotator 304 can be fed the negated angle decisions from s memory 310 to return y to its original angular position, now without the presence of the component parallel to s. In another embodiment, the reverse pass may be omitted, postponing the computation of $y^\perp$ to a later stage. The correction factor $1/\beta = \sin\theta$ can still be computed for later use.

In certain embodiments, another factor, $$\alpha = (s^T s)^{-1} s^T y \quad (13)$$

used in subtractions of the form $$y^\perp = y - \alpha s \quad (14)$$

can be computed by:

$$\alpha_N = \frac{(D_s s)^T (D_s y)}{(D_s s)^T (D_s y)} = \frac{y'_{N-1}}{s'_{N-1}}, \quad (15)$$

where $s'_{N-1}$ is the last coordinate of the first pass of the algorithm over s. This factor can be computed in block 306 in FIG. 3, but this division can also be performed using one of CORDIC pipelines 302 and 304 in FIG. 3. Computation of $\alpha$ can be useful in embodiments where it is done at the chip rate to keep the time and memory cost of CORDIC rotator 300 down, while the actual subtraction or projection is done at the sample rate, which is effectively a higher number of projection dimensions, using equation (14) directly. In such an embodiment, s and y memories 310 and 316 and logic specific to them may be omitted.

Figure 7:
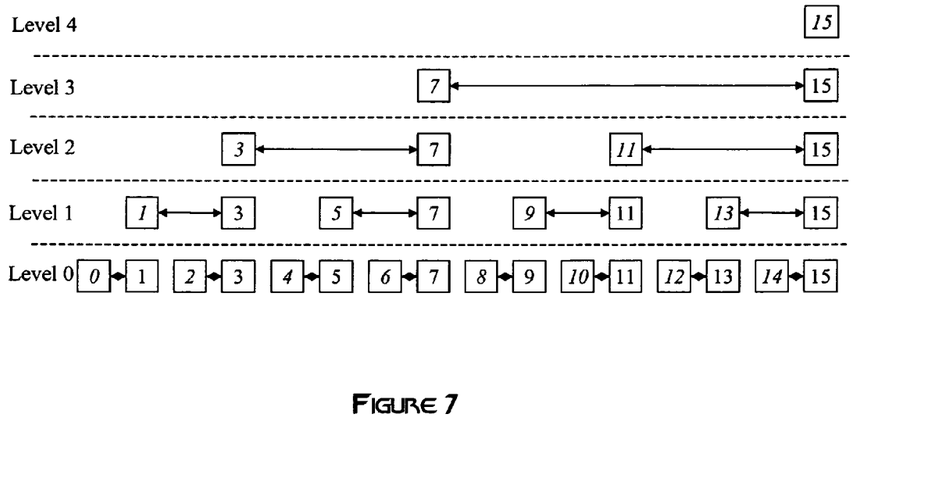
FIG. 7 illustrates an example dimension pairing pattern for a forward pass of the CORDIC rotator of FIG. 3 where N=16.

Examples of dimension-pairing patterns for the forward pass of rotator 300 appear in FIG. 7. Double-ended arrows connect elements that participate in a CORDIC rotation, and elements with italicized labels are the CORDIC y-coordinates, which are either zeroed in s or considered to have been rotated in y. As the figures show, these elements drop from coordinate pairing at higher levels in the pairing hierarchy. The use of such hierarchy is made possible by the use of buffers 308 and 320.

The element $s'_{N-1}$ remains after the $(N-1)^{th}$ rotation and $|s'_{N-1}|$ is equal to $\|s\|$ and $y'_{N-1}$ remains in the last cell of y memory 316, where it can be zeroed. The reverse pass is performed in a precisely reversed order, operating this time only on y memory, since only y needs be de-rotated. The hierarchical access patterns, such as shown in FIG. 7, are used to limit the number of successive CORDIC operations to which any output coordinate is subjected to $\log_2 N$, keeping cumulative computational error to a minimum. FIG. 7 illustrates a dimension-pairing pattern where N=16.

As explained above, the projection proceeds by first feeding y and s into pipelines 302 and 304, respectively. At the pipeline output, the CORDIC y-coordinate is retired from computation, since it has been annihilated in s, and the CORDIC x-coordinate is passed on to the next-higher level in the hierarchy, as shown in FIG. 7. Because rotations at level n+1 occur at half the rate of level n, as labeled in FIG. 7, CORDIC x-coordinates at the pipeline output are alternately buffered in buffers 308 and 320, then combined into CORDIC x- and y-coordinates at the pipeline input to be passed on to the next-highest level in the pairing hierarchy. Whenever this recirculation occurs, input of y and s is suspended. The number of buffer registers required in the buffer-and-combine process for a given vector length N has been found in simulation never to be greater than $(\log_2 N) - 2$ for anticipated common vector lengths of 32, 64, 128, 256, 512, and 1024, and pipeline depths of 5 through 20 stages.

The first half of a rotation pass keeps the pipeline full, but sometime after half of the total number of clock cycles required for the rotation pass have elapsed, data dependencies in the pairing hierarchy force insertion of bubbles into the pipeline, causing it to be more and more idle toward the end of the rotation. Because pipelines 302 and 304 consume by far the most area of any of the functional units in rotator 300, they can, depending on the embodiment, be multiplexed at the clock cycle level, either between multiple projections, or between projections and other rotation tasks to which CORDIC is suited, such as phase rotation or scaling.

Figure 4:
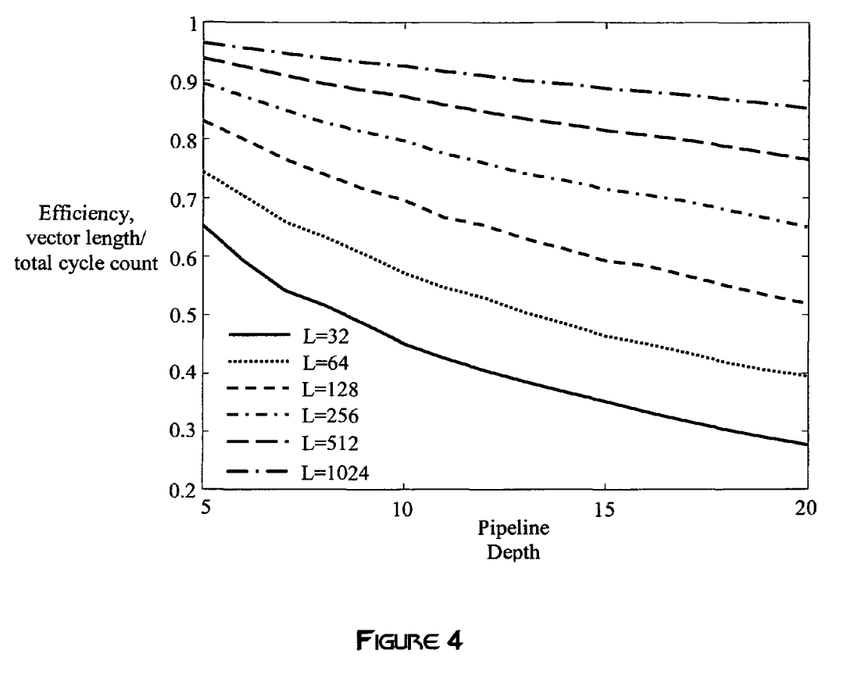
FIG. 4 is a graph illustrating the clock cycle efficiency as a function of a pipeline depth and a vector length for the pipeline included in the CORDIC rotator of FIG. 3.

FIG. 4 is a graph illustrating the clock cycle efficiency of the rotator as a function of pipeline depth and vector length L. It can be seen that efficiency increases as the ratio of pipeline depth to vector length decreases.

Figure 5:
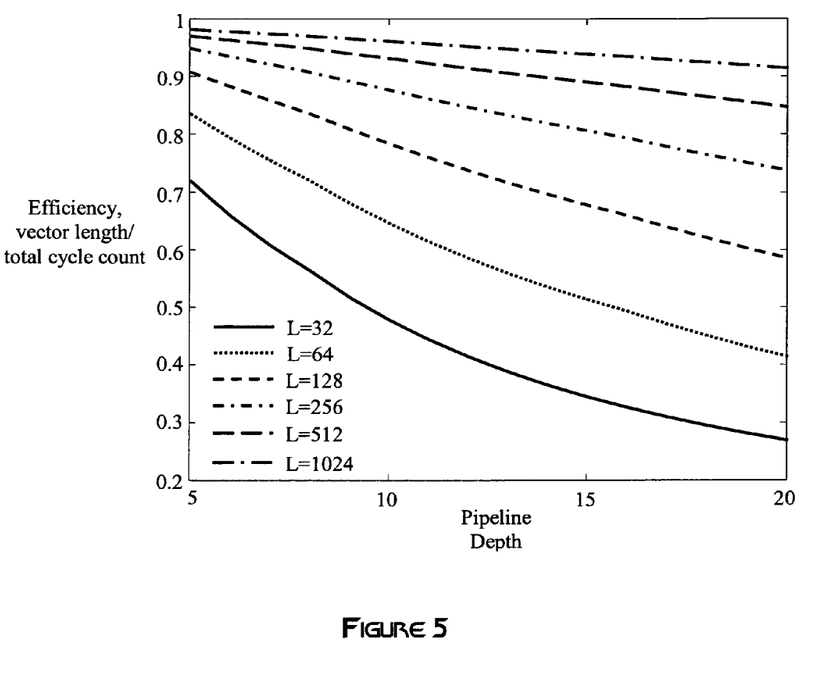
FIG. 5 is a graph illustrating the clock cycle efficiency as a function of a pipeline depth versus vector length when a greedy scheme is implemented in the CORDIC rotator of FIG. 3.

A variation on the hierarchical buffer-and-combine scheme illustrated in FIG. 7 is a scheme in which a pipeline output coordinate is immediately combined with whatever coordinate is in the buffer, re-circulating that pair, without regard for the hierarchical noise-limiting scheme. This "greedy" scheme of course has only one buffer storage element, and, as can be seen in FIG. 5, can be more cycle-efficient. There is, however, also an increase in computational noise, indicated in the graph of FIG. 6.

Figure 6:
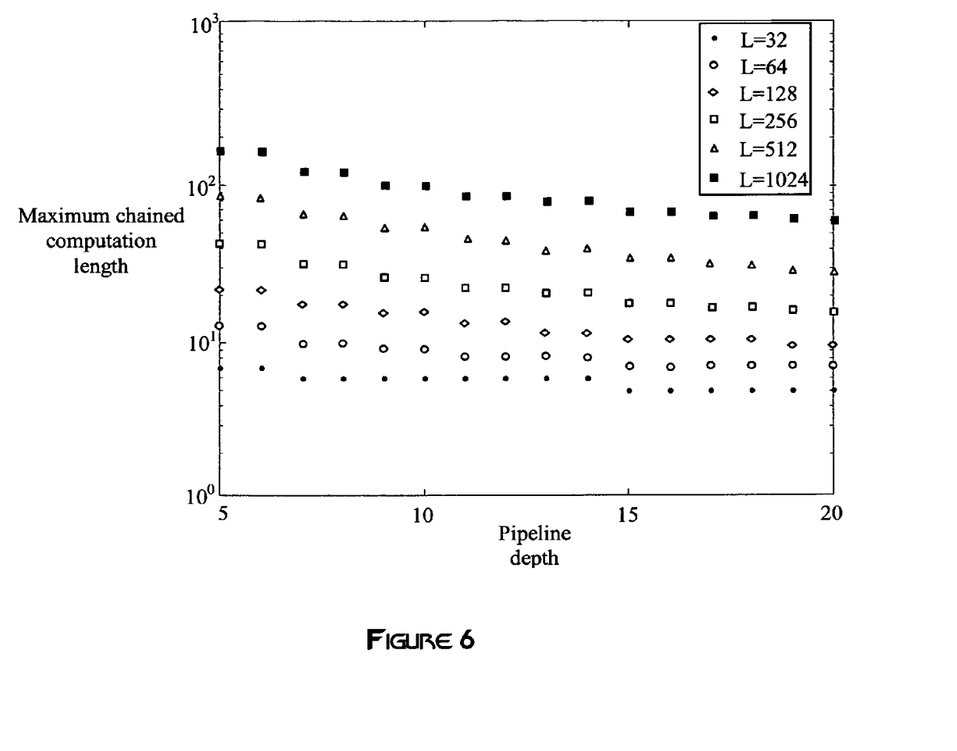
FIG. 6 is a graph illustrating the chained operation length for greedy operations for various pipeline lengths.

As illustrated in FIG. 6, the chained operation length for N<256 is tolerably close to the hierarchical operation length for practical pipeline lengths, but, above this vector length, the chained operation length makes the greedy scheme less attractive.

To further reduce the gate count of rotator 300, it is possible to combine master and slave pipelines 302 and 304 into one pipeline, then time-interleave the introduction of samples into the pipeline. The s coordinate pairs would lead the y pairs by one stage in the pipeline, and the s angle decisions would be used for the y pairs. This scheme takes exactly twice the number of clock cycles for rotation as the two-pipeline scheme.

It should be noted that the divide cycle count for a commonly used shift-and-subtract-style divider is approximately equal to the bit widths of the required quotients, making it a small contributor to the overall projection operation. Division is performed after the first pass to provide quotients required by the reverse pass or an $\alpha$-based projection. But the x-to-y coordinate conversion and division operations performed in the CORDIC pipeline each have a latency equal to the CORDIC pipeline depth, and the $\alpha$ division can be overlapped with the coordinate conversion, making the total delay for these three operations about equal to two pipeline delays.

An embodiment of a CORDIC rotator may be configured to implement the algorithm described herein to provide for a low gate count solution that is small in size and has a reduced computational overhead. Table 1 shows gate count estimates for a conventional inner-product/AGC projector compared to a particular CORDIC rotator embodiment of the invention. This invention may, however, be embodied in many different forms and should not be construed as limited to the embodiments set forth herein. Furthermore, particular benefits described and/or quantified herein should not be interpreted as limiting the invention. Rather such benefits are mentioned merely to demonstrate how particular embodiments of the invention may be useful. Alternative embodiments may have different measurable degrees of benefit and/or may have entirely different benefits and/or applications than described herein.

Computations are for an up-sampling factor of 8, with $\alpha$ computed at the chip rate and actual projection being performed at the sample rate. Data paths are assumed to incorporate no unnecessary parallelism, and only one I/Q channel is considered outside the AGC. AGC gain or β is a 6-bit number, and the input to the AGC or β multiplier is 4 bits narrower than the projection computation data. Only the data paths are included in the estimate, and flip flops are simply considered to comprise 40 percent of the design.

TABLE 1

Gate count comparison

| | |
|---|---|
| Two-to-one mux gates/bit | 2.2 |
| Adder gates/bit | 8 |
| Flip-flop gates | 10 |
| Flip-flop inflation factor | 0.6666667 |
| Projection bit width | 16 |
| Log2(projection vector length) | 6 |
| Number of CORDIC pipelines | 2 |
| IP gate count | 31075.333 |
| CORDIC gate count | 21121.768 |
| IP/CORDIC gate count | 1.4712468 |
| AGC | |
| Power accumulator | 112 |
| Set point subtractor | 112 |
| Loop gain multiplier | 112 |
| IIR | 288 |
| Power summer | 72 |
| Squarer | 192 |
| Flip-flop inflation | 592 |
| Total | 1480 |
| Vector Processor | |
| General-purpose multiplier | 1920 |
| MAC accumulator | 176 |
| Reciprocal calculator | 1617 |
| Truncate and balance $s^T y$ | 169.6 |
| AGC saturator | 105.6 |
| Siq_to_mult multiplexer | 35.2 |
| Iqnx_scaled | 70.4 |
| Sxy | 35.2 |
| Sum_sxy and tbs | 531.2 |
| Mult_in | 316.8 |
| Negative_check | 140.8 |
| Sigma_sat | 99.2 |
| STY_sigma | 96 |
| SSTY_sigma | 74.8 |
| YMSSTY_sigma | 273.4 |
| Flip-flop inflation | 3774.1333 |
| Total | 9435.3333 |
| Phase insert and strip | |
| Bit width | 14 |
| Multiply and add | 12096 |
| Flip-flop inflation | 8064 |
| Total | 20160 |
| CORDIC α and β computer | |
| CORDIC pipeline depth | 16 |
| CORDIC adders/negators | 310.83316 |
| Vectoring-only CORDIC pipelines | 9946.6611 |
| Pipeline input multiplexers | 492.8 |
| Buffer/combine muxes, greedy | 70.4 |
| Hyperbolic shift 4 mux | 70.4 |
| Linear-mode multiplexers | 1196.8 |
| Normalize/denormalize | 256 |
| Fix CORDIC scale | 640 |
| Flip-flop inflation | 8448.7074 |
| Total | 21121.768 |

With a 16-deep dual pipeline, greedy pipeline usage, and a vector length of 64, a CORDIC rotator configured as described herein takes 128 clock cycles for the rotation operation, and requires 7 levels of chained computation. The x-to-y conversion and divides take two pipeline delays plus one clock of non-overlapped time, or 128+16*2+1=161 cycles from load of the first s coordinate until availability of α and β. For the single-pipeline case, the cycle count increases to 256+16*2+1=289.

In the equivalent minimal-hardware scenario, the inner-product projector makes two vector passes to compute $s^T s$ and $s^T y$, then performs a division to compute α. Overlapping the first vector pass with input of coordinate pairs, this amounts to a total of 64+18=82 cycles for the same operation, assuming that the $s^T y$ multiplication is overlapped with interpolator operation. Processing during input is possible also with the CORDIC rotator, but is more cumbersome because of the need to hold off input of y and s elements as recirculations occur in the pipeline.

With a single-pipeline CORDIC rotator, the estimated latency from start until output of the final cancelled sample is 1013 clock cycles, whereas with the direct inner product (IP) projector, the latency is 845 cycles. The advantage of the CORDIC rotator over the IP projector is that it directly computes β, which may provide a performance advantage over an AGC-based system due to AGC startup transients in environments where cancellers are frequently reassigned. If β computation were to be incorporated with the inner-product projector, the computation would probably use CORDIC, although it might be implemented in a non-pipelined fashion to save area.

Figure 8:
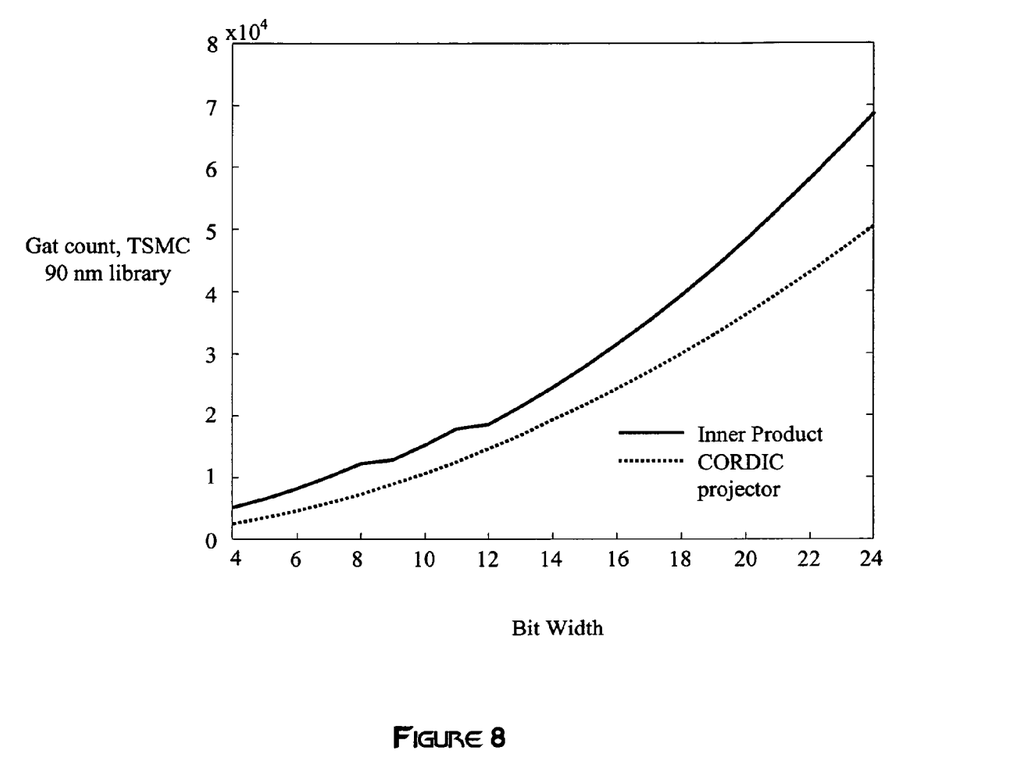
FIG. 8 is a graph illustrating CORDIC and inner-product projector gate counts as a function of bit width.

FIG. 8 plots CORDIC rotator and IP projector gate counts, as a function of bit width. Gate counts for both the double- and single-pipeline versions of the CORDIC rotator are shown.

In certain embodiments, CORDIC rotator 300 can be configured to implement oblique projections using the same general techniques used to perform orthogonal projections. "Signal Processing Applications of Oblique Projection Operators," R. T. Behrens and L. L. Scharf, IEEE Trans. On Signal Processing 42(6), 1413-1424, which is included herein by reference in its entirety, describes oblique projections. Specifically, FIG. 2 of this reference provides a geometric representation of the variables mentioned here. Given a structured noise subspace vector s, a desired signal subspace vector h, with the condition that h and s are linearly independent (s≠ha), and a received signal vector y, the oblique projection seeks to find a projected vector $E_{HS}y$, which is the projection onto (h) along the direction of (s).

The CORDIC-based oblique projection first rotates h onto the last Euclidean axis $e_{N-1}$, applying the same set of rotation decisions $D_h$ to s and y. Then s is rotated until it lies in the plane ($e_{N-2}$ $e_{N-1}$), applying the same set of rotation decisions $D_s$ to y. The rotation of s is accomplished by applying successive Givens rotations to s to annihilate coordinates corresponding to $e_0$ through $e_{N-3}$. Applying $D_h$ to h annihilates all but the last coordinate of h, while applying $D_s$ to s annihilates all but the last two coordinates of s. It should be noted that, since multiplication by $D_s$ does not modify coordinate $e_{N-1}$ in either s or y, $D_s$ may be considered to perform a rotation of s and y about h.

Use of the prime modifier on a vector (x') indicates that the vector is in the coordinate system rotated by $D_s D_h$. The rotated version of y, $y'=D_s D_h y$, can be projected onto ($e_{N-2} e_{N-1}$) by simply zeroing coordinates $e_0$ through $e_{N-3}$ of y' to yield $P_{HS}y'$. At this point $P_{HS}y'$, $D_s D_h s$, and $D_h h$ all reside in ($e_{N-2}$ $e_{N-1}$), and the computation of the norm of $E_{HS}Y$, which in the current rotated coordinate system lies completely on $e_{N-1}$, is a simple two-dimensional problem. Starting with a vector equation and separating into individual vector coordinates:

$$P_{HS}y' = E_{HS}y' + E_{SH}y' \quad (16)$$

$$\begin{bmatrix} 0 \\ (P_{HS}y')_{N-2} \\ (P_{HS}y')_{N-1} \end{bmatrix} = \begin{bmatrix} 0 \\ 0 \\ (E_{HS}y')_{N-1} \end{bmatrix} + \begin{bmatrix} 0 \\ (E_{SH}y')_{N-2} \\ (E_{SH}y')_{N-1} \end{bmatrix} \quad (17)$$

$$\frac{(E_{SH}y')_{N-1}}{(E_{SH}y')_{N-2}} = \frac{s'_{N-1}}{s'_{N-2}} \quad (18)$$

$$(E_{SH}y')_{N-1} = \frac{s'_{N-1}(E_{SH}y')_{N-2}}{s'_{N-2}} = \frac{s'_{N-1}(P_{HS}y')_{N-2}}{s'_{N-2}}$$

where the notation $(s')_{N-1}$ denotes the N−1 coordinate of s'.

With $\|E_{HS}y\|$ known, it is simply necessary to rotate $E_{HS}y'$ back to the original coordinate system. This could be done by computing $D_h^{-1}D_s^{-1}E_{HS}y'$ in two passes of Givens rotations, but noting that $D_s$ is a rotation about h and therefore a rotation about $E_{HS}y'$, application of $D_s^{-1}$ will have no effect on $E_{HS}y'$ and therefore may be omitted.

Using rotator hardware that is essentially the same as that used for orthogonal projection, it is possible to perform the oblique projection described above in three Givens passes, compared to the two Givens passes required for orthogonal projection.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed:

1. A Coordinate Rotation Digital Computer (CORDIC) rotator, comprising:
   a master pipeline configured to rotate coordinate pairs representative of an interference signal and to generate angle decisions for each successive rotation;
   a first buffer with an input coupled with an output of the master pipeline and an output coupled with an input of the master pipeline, the first buffer configured to store the output of the master pipeline and re-circulate the stored output to the input of the master pipeline;
   a slave pipeline configured to rotate coordinate pairs representative of a measurement signal using the angle decisions generated by the master pipeline;
   a second buffer with an input coupled with an output of the slave pipeline and an output coupled with an input of the slave pipeline, the second buffer configured to store the output of the slave pipeline and re-circulate the stored output to the input of the slave pipeline, the master and slave pipelines configured to operate in parallel; and
   a CORDIC divide block coupled with the outputs of the master and slave pipelines, the CORDIC divide block configured to generate an α factor that is related to a scaling factor according to the following equation:

$$\alpha_N = \frac{y'_{N-1}}{s'_{N-1}},$$

where $S'_{N-1}$ and $y'_{N-1}$ are final outputs of the first pass of the master and slave pipelines, respectively;

wherein the computation of α is performed at a chip rate, while the operation of the master and slave pipelines is performed at a sample rate.

2. The CORDIC rotator of claim 1, further comprising a memory configured to store the angle decisions generated by the master pipeline.

3. The CORDIC rotator of claim 2, wherein the memory is configured to store the negatives of the angle decisions generated by the master pipeline, and wherein the slave pipeline is further configured to de-rotate the measurement signal using the negatives of the angle decisions stored in the memory.

4. The CORDIC rotator of claim 3, further comprising a second memory coupled between the output and input of the slave pipeline, the second memory configured to store the outputs of the slave pipeline for use in de-rotating the measurement signal.

5. The CORDIC rotator of claim 1, further comprising a scaling factor generation block configured to generate a scaling factor for scaling the output of the slave pipeline at the end of one forward pass through the slave pipeline.

6. The CORDIC rotator of claim 5, wherein the scaling factor generation block comprises
   a CORDIC x-to-y conversion block configured to perform an x-to-y coordinate conversion on the output of the slave pipeline at the end of the forward pass, and
   a CORDIC divide block coupled with the CORDIC operation block, the CORDIC divide block configured to perform a CORDIC divide on the output of the CORDIC x-to-y conversion block.

7. The CORDIC rotator of claim 5, further comprising a multiplier coupled with the output of the slave pipeline and the output of the scaling factor generation block, the multiplier configured to multiply the output of the slave pipeline by the scaling factor.

8. The CORDIC rotator of claim 5, wherein the scaling factor is a sin θ scaling factor.

9. The CORDIC rotator of claim 1, wherein at least one of the master and slave pipelines is configured to generate a scaling factor for scaling the output of the slave pipeline at the end of one forward pass through the slave pipeline.

10. The CORDIC rotator of claim 9, further comprising a multiplier coupled with the output of the slave pipeline, the multiplier configured to multiply the output of the slave pipeline by the scaling factor.

11. The CORDIC rotator of claim 9, wherein the scaling factor is a sin θ scaling factor.

12. The CORDIC rotator of claim 1, wherein the rotations performed by the master and slave pipelines are performed in accordance with hierarchal or greedy access patterns.

13. The CORDIC rotator of claim 1, wherein the rotations performed by the master and slave pipelines are performed using CORDIC implementations of Givens rotations.

14. The CORDIC rotator of claim 1, wherein the rotation operation of at least one of the master and slave pipelines is multiplexed at the clock cycle level between multiple projections.

15. The CORDIC rotator of claim 1, wherein the rotation operation of at least one of the master and slave pipelines is multiplexed at the clock cycle between projections and other rotation tasks.

16. The CORDIC rotator of claim 15, wherein one of the other rotation tasks is a phase rotation.

17. The CORDIC rotator of claim 15, wherein one of the other rotation tasks is a scaling operation.

18. The CORDIC rotator of claim 1, wherein rotations performed by the master and slave pipelines comprise at least one orthogonal projection.

19. The CORDIC rotator of claims 1, wherein the master and slave pipelines are configured to perform at least one two-dimensional linear transformation for executing an oblique projection.

20. The CORDIC rotator of claim 1, wherein the master and slave pipelines are part of a single pipeline, and wherein the functions of the master and slave pipelines are performed by interleaving the associated operations in the single pipeline.

21. A method for performing a Coordinate Rotation Digital Computer (CORDIC) projection in a CORDIC rotator comprising master and slave rotation pipelines operating in parallel, comprising:
    rotating an interference signal using the master pipeline, the rotation resulting in angle decisions;
    rotating a measurement signal in the slave pipeline using the angle decisions;
    generating a scaling factor using either the master or slave pipeline;
    scaling the final output of the slave pipeline using the generated scaling factor;
    de-rotating the measurement signal in the slave pipeline using the negative of the angle decisions; and
    generating an $\alpha$ factor that is related to the scaling factor according to the following equation:

$$\alpha_N = \frac{y'_{N-1}}{s'_{N-1}}$$

where $S'_{N-1}$ and $y'_{N-1}$ are final outputs of a first pass of the master and slave pipelines, respectively;
    wherein the computation of $\alpha$ is performed at a chip rate, while the operation of the master and slave pipelines is performed at a sample rate.

22. The method of claim 21, wherein rotations performed by the master and slave rotation pipelines comprise at least one orthogonal projection.

23. The method of claim 21, wherein the master and slave rotation pipelines are configured to perform at least one two-dimensional linear transformation for executing an oblique projection.

24. The method of claim 21, wherein the master and slave pipelines are part of a single pipeline, and wherein rotating the interference signal and the measurement signal comprises interleaving the rotations in the single pipeline.

25. A Coordinate Rotation Digital Computer (CORDIC) projection system, comprising:
    a means for rotating an interference signal to produce angle decisions;
    a means for rotating a measurement signal using the angle decisions to produce a rotated measurement signal;
    a means for generating a scaling factor;
    a means for scaling the rotated measurement signal using the generated scaling factor;
    a means for de-rotating the measurement signal using the negative of the angle decisions; and
    a means for generating an $\alpha$ factor that is related to the scaling factor according to the following equation:

$$\alpha_N = \frac{y'_{N-1}}{s'_{N-1}}$$

where $S'_{N-1}$ and $y'_{N-1}$ are final outputs of a first pass of the master and slave pipelines, respectively;
    wherein the computation of $\alpha$ is performed at a chip rate, while the operation of the master and slave pipelines is performed at a sample rate.

26. The method of claim 25, wherein the means for rotating the interference signal and the means for rotating the measurement signal are configured to perform at least one orthogonal projection.

27. The method of claim 25, wherein means for rotating the interference signal and the means for rotating the measurement signal are configured to perform at least one two-dimensional linear transformation for executing an oblique projection.

28. The method of claim 25, wherein the means for rotating the interference signal and the means for rotating the measurement signal are part of a single pipeline, and wherein rotating the interference signal and the measurement signal.

* * * * *